Nov. 10, 1942. G. S. MONK ET AL 2,301,740
PLURAL LENS MOUNT
Filed June 19, 1940 4 Sheets-Sheet 3
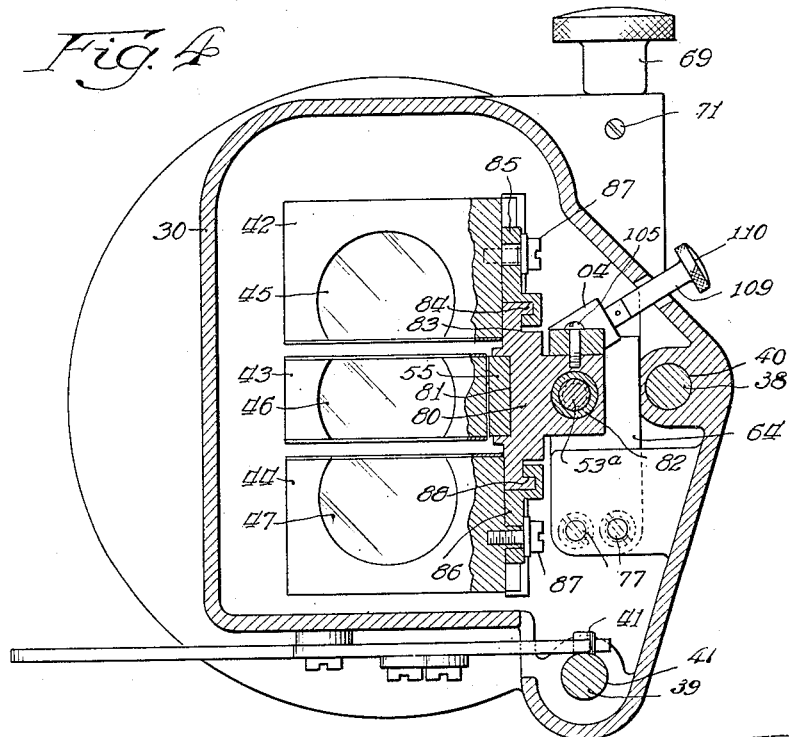
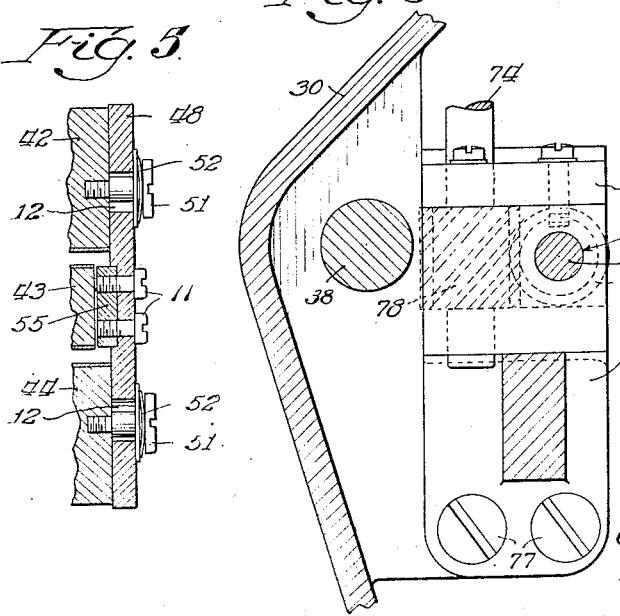
Inventors:
George S. Monk and
Frank P. Case.
By: Hill and Hill
Attys.
Witness:
V. Siljander Nov. 10, 1942.   G. S. MONK ET AL   2,301,740
PLURAL LENS MOUNT
Filed June 19, 1940   4 Sheets-Sheet 4

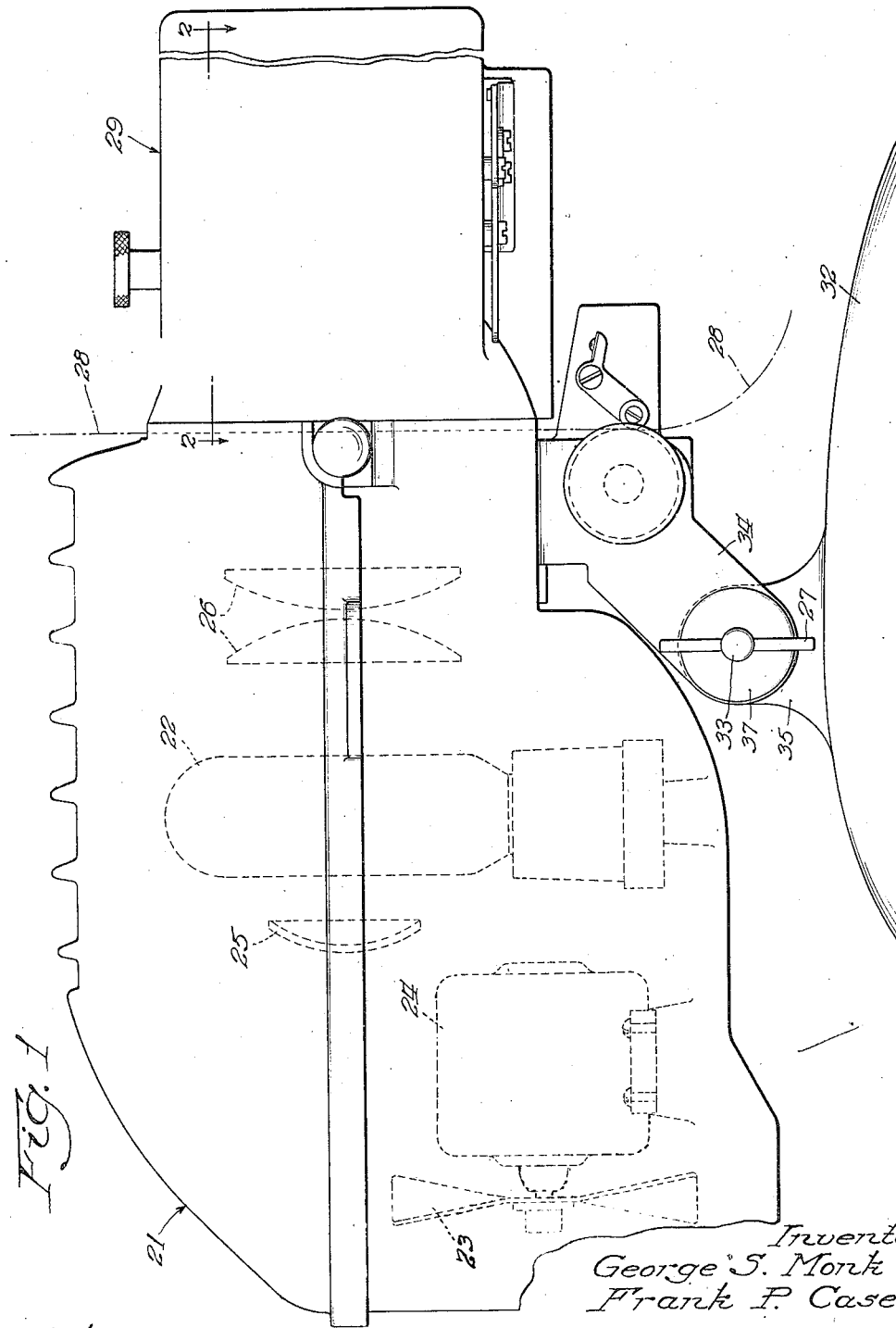

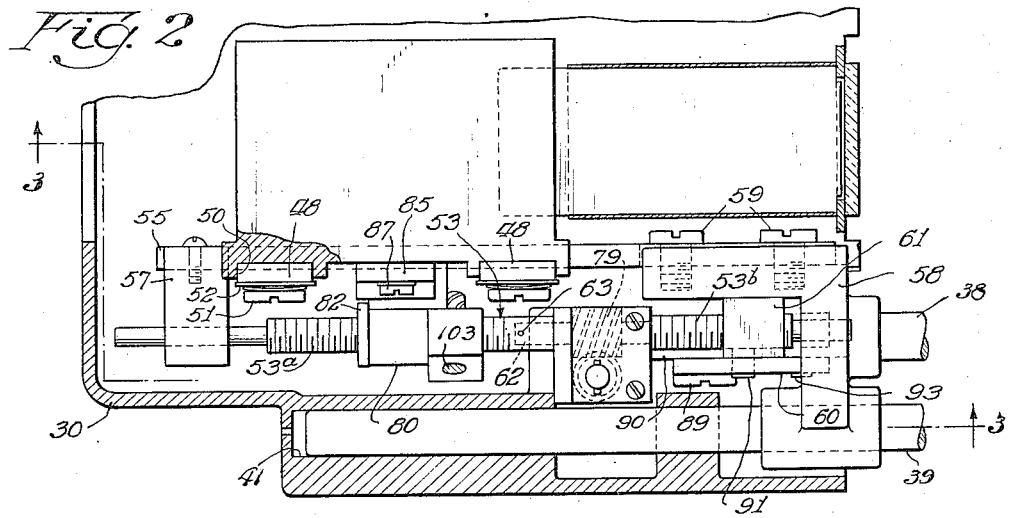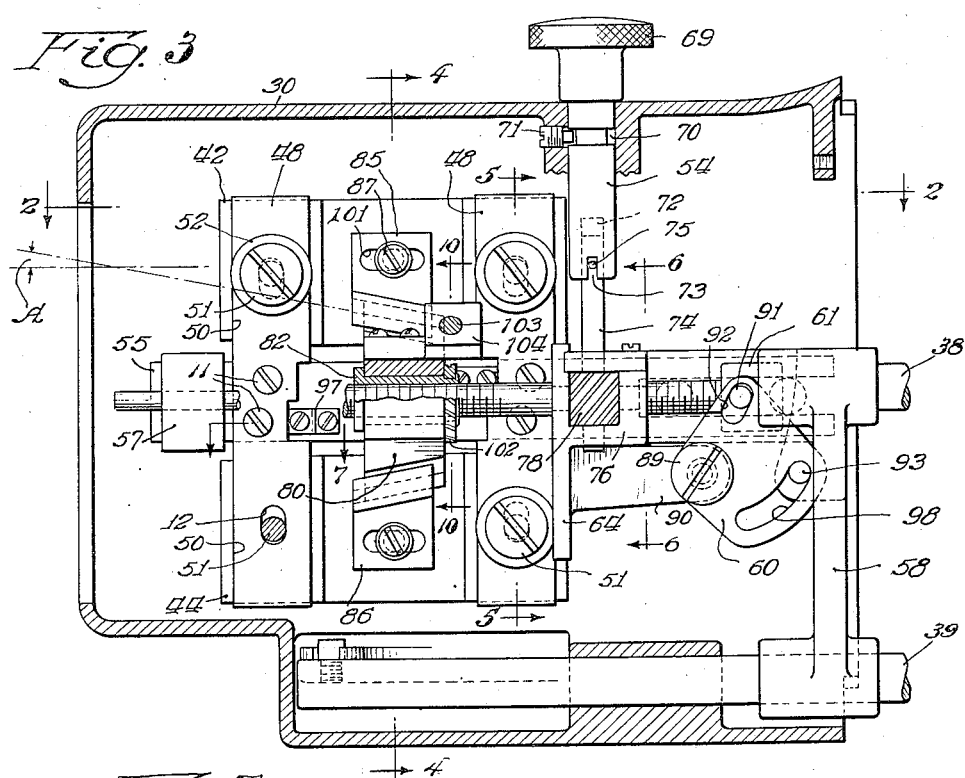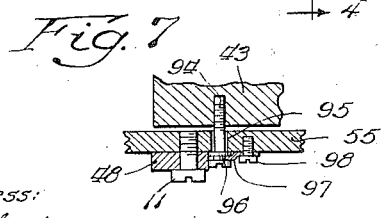

Inventors:
George S. Monk and
Frank P. Case.

By Hill and Hill
Attys.

Witness:
V. Siljander

Patented Nov. 10, 1942

2,301,740

UNITED STATES PATENT OFFICE 2,301,740

PLURAL LENS MOUNT

George S. Monk and Frank P. Case, Chicago, Ill., assignors to Prismacolor, Inc., Chicago, Ill., a corporation of Illinois Application June 19, 1940, Serial No. 341,314

12 Claims. (Cl. 88—16.4)

The invention relates to apparatus for projecting in exact superimposed relation upon a screen, of a plurality of images or color cut-outs of the same photographed object impressed upon a plate or a film. More particularly, the invention relates to improved means operable to obtain accurate registry of the images projected upon a screen by a plurality of lenses for all practicable projection distances including the shortest and for a plurality of color cut-out spacings.

As is well known to those familiar with the art, the individual images or color cut-outs of the same photographed object provided by a film or plate are projected upon a screen by an assembly of juxtaposed lenses, the individual lenses being positioned in the path of light passing through the respective color cut-outs and focused upon a screen in superimposed relation. For example, the assembly comprises three laterally juxtaposed lenses in three-color projection, the lenses being in vertical juxtaposition when used with films movable vertically through the projector and in horizontal juxtaposition if the films are moved horizontally. The focal planes of the images are brought into coincidence with the projection screen by advancing or retracting the lenses together as a unit, and exact superimposition of the various images can only be accomplished by moving the outer lenses towards and away from the middle lens at rates having a variable ratio relative to the rate that the lenses are advanced or retracted together as a unit for focusing upon a screen.

The invention has as one of its objects the provision of mechanism operable simultaneously to advance or retract the lenses in accordance with the distance of the screen from the projector and to correspondingly change the lateral spacing of the lenses to obtain accurate superimposition upon the screen of the images respectively projected by the lenses. More particularly, the invention provides improved means for actuating a plurality of lenses having parallel optical axes and a common image plane, said means being operable to advance or retract the lenses together to correspondingly vary the distance of their common image plane to bring it into coincidence with the projection screen and being also operable to simultaneously move the lenses together or apart manually in an amount such that the images respectively produced by said lenses are in exact superimposition in said plane for all positions of the lenses.

It is well known to those familiar with the art that films used in projection are frequently distorted by shrinkage or otherwise, and as a result, spacing of the color cut-outs or frames thereon are not identical with the spacings at the time of exposure in a camera. A further object of the invention is to provide novel means for imparting relative transverse movement to the projector lenses without longitudinal or focusing movement to adjust the transverse spacing thereof to correspond to variations in the color cut-out spacings on the films from which images are being projected.

Still another object of the invention is the provision of improvements in lens mounts or housings of the kind described which are durable, simple, inexpensive to manufacture and satisfactory for their intended purpose.

Referring now to the drawings, wherein like reference characters indicate like or corresponding parts:

Fig. 1 is a side elevational view of a projector including a plural lens mount embodying the principles of the invention;

Fig. 2 is a view taken substantially along the lines 2—2 of Figs. 1 and 3;

Fig. 3 is a view taken along the line 3—3 of Fig. 2;

Fig. 4 is a view along the line 4—4 of Fig. 3;

Fig. 5 is a view along the line 5—5 of Fig. 3, drawn to a larger scale;

Fig. 6 is a view along the line 6—6 of Fig. 3 drawn to a larger scale;

Fig. 7 is a view along the line 7—7 of Fig. 3;

Figure 9:
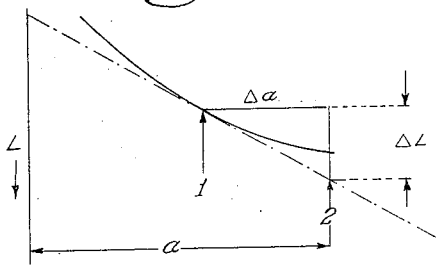

Fig. 9 diagrammatically represents, by means of a curved and a tangential line, the requisite inclination of cam faces to be provided by a guide; and Fig. 10 is a fragmentary view of certain details shown in Fig. 4.

Referring now more particularly to the drawings, Fig. 1 is a side elevational view of a projector embodying a portable case 21 and a lens mount or port housing generally designated by the numeral 29.

The case 21 provides a housing for an electric lamp 22, a fan 23, a motor 24 for actuating the fan, a reflector 25, and condensers 26. The motor 24 is adapted to be operatively connected with any suitable source of electrical energy by a circuit not shown. A further description of the foregoing enumerated elements contained in the case 21 has been omitted since these elements may be of any construction and arrangement suitable to cause light to pass through a film 28 and through the lens mount or port housing 29.

The case 1 and the lens mount or port housing 29 are operatively connected and are tiltably mounted on a support 32 by means of a transversely extending horizontal pivot 33.

A pair of arms 34 project downwardly from the case 21 and engage the opposite ends of a lug 35 formed on the bottom support 32. One end of the pivot 33 threadedly engages the contiguous arm 34, and the other end of the pivot provides a shoulder spaced from the contiguous end of the lug 35 and between which is positioned a washer 37. The pivot 33 is rotatable by a diametrically extending pin 27. The projector is rotatable about the pivot 33 as an axis to suitably incline the projector to the horizontal and is fastened at any desired angle of inclination by turning the pivot to clamp the arms 34 against the ends of the lug 35.

The film 28 extends through the projector as shown fragmentarily in Fig. 1, it being understood that the film is connected with winding and unwinding devices not shown, disclosure of which is omitted as being unnecessary to an understanding of the invention.

The port housing 29 comprises a casing 30 slidably supported on rods 38 and 39 rigidly fastened to and projecting from the front end of the projector case 21. The rods 38 and 39 project into or extend through and respectively closely fit cylindrical bores 40 and 41 formed on the inner sides of the casing 30. It is desirable that the port housing 29 be moved away from the projector case 21 in order that the film may be easily inserted, as previously described, and for this purpose, the casing 30 is arranged to be slidable back and forth on the rods 38 and 39 in any suitable manner, not shown.

Three vertically juxtaposed and spaced apart lens carrying members respectively designated by the numerals 42, 43, and 44 are positioned in the front end of the housing 30. The members 42, 43, and 44 respectively carry lenses 45, 46 and 47, so arranged and positioned that their optical axes are in exact parallelism and the lenses have a common image plane. A bar 55, actuated, as hereinafter described, is adapted to move the lens carrying members 42, 43 and 44 longitudinally in the housing 30. Two plates 48, rigidly fastened to the bar 55 by screw bolts 11, extend transversely to and connect the lens carrying members 42, 43, and 44. The upper and lower ends of the plates 48 each provide an elongated slot 12 extending perpendicularly to the direction of movement of the bar 55 and to the optical axes of the lenses 45, 46 and 47. The connecting plates 48 are positioned in and have a close slidable fit in recesses or slots 50 provided by the members 42 and 44. The slots 50 also extend perpendicularly to the optical axes of the lenses 45, 46 and 47, and as a result, movement of the outer members 42 and 44 toward and away from the middle member 43 is such that the optical axes of the lenses remain parallel for all positions of the members. The plates 48 are maintained in the slots 50 and in close sliding contact with the upper and lower members 42 and 44, respectively, by means of screw bolts 55 extending through the slots 12. The heads of the bolts 51 are spaced from the outer face of the plates 48 and spring washers 52, positioned between said heads and plates, are adapted to maintain the plates in the slots 50 and to hold the lenses carried thereby with their optical axes in parallel alignment. The washers 52 are sufficiently resilient as not to retard movement of the screws 51 in the slots 12 as the members 42 and 44 are moved toward and away from the member 43 for focusing of the lenses at different screen distances in a manner hereinafter more particularly described.

The middle lens carrying member 43 is rigidly fastened near each end to the bar 55 by bolts 94 extending through holes 95 provided by the bar, as best shown in Fig. 7. The holes 95 permit movement of the member 43 for focusing adjustment of the position of the member relative to the members 42 and 44. The head ends of the bolts 94 project beyond the bar 55 and each provides an annular recess 96 spaced from the bar to receive the forked end of an adjusting screw clamp or plate 97. The other ends of the plates 97 are in direct contact with and rigidly fastened to the bar 55 by means of screw bolts 98. Obviously, by threading the bolts 94 into the lens carrying member 43, the latter will be moved toward the bar 55 and opposite threading of the bolts will move the member away from the bar. The described mounting of the member 43 permits the lens 46 carried thereby to be initially mounted or subsequently adjusted laterally with its optical axis in a common plane with the optical axes of the lenses 45 and 47. The slots 12 in the plates 48 and the holes 95 in the bar 55, permit the members 42, 43 and 44, respectively carrying the lenses 45, 46 and 47, to be initially shop assembled and subsequently adjusted when necessary to obtain exact registration of the images projected by the three lenses.

An important feature of the invention is the novel means provided for moving the lens carrying members 42, 43, and 44 together longitudinally as a unit and to simultaneously move the outer members 42 and 44 toward and away from the intermediate member 43 with the respective optical axes of the lenses 45, 46 and 47 constantly parallel as above described. Movement of the outer lenses 45 and 47 transversely toward and away from the lens 46 and the longitudinal movement of the lenses as a unit is accomplished simultaneously in a manner hereinafter more particularly described, by rotation of a lead screw 53, the longitudinal movement of the lenses being for the purpose of accurately focusing the images projected in said common image plane as it is moved to correspond to projection at different screen distances and said transverse movement of the lenses 45 and 47 being for the purpose of securing exact registry of the images in said common image plane for all relative positions of said lenses.

The following calculations and tabulated results of such calculations indicate that absolutely exact registry of the three images respectively projected by the lenses 45, 46 and 47 throughout the entire range of practicable projection distances from the greatest to the least requires that the ratio of the longitudinal movement of the three lenses as a unit to the transverse movement of the outer lenses relative to the middle lens must be constantly changed for different screen distances. Theoretically, this variable ratio may be maintained either by providing means simultaneously operable to actuate the lenses longitudinally and transversely and to vary the amount of transverse movement relative to the amount of longitudinal movement or by providing means such that the amount of longitudinal movement is changed relative to the amount of transverse movement of the lenses. The calculations also show that the values of such constantly varying ratios for exact image registry in any given projection system depends upon the focal length of the lenses used and also upon the separation or spacing center to center of the frames or color cut-outs impressed on the plate or film from which the images are projected.

Figure 8:
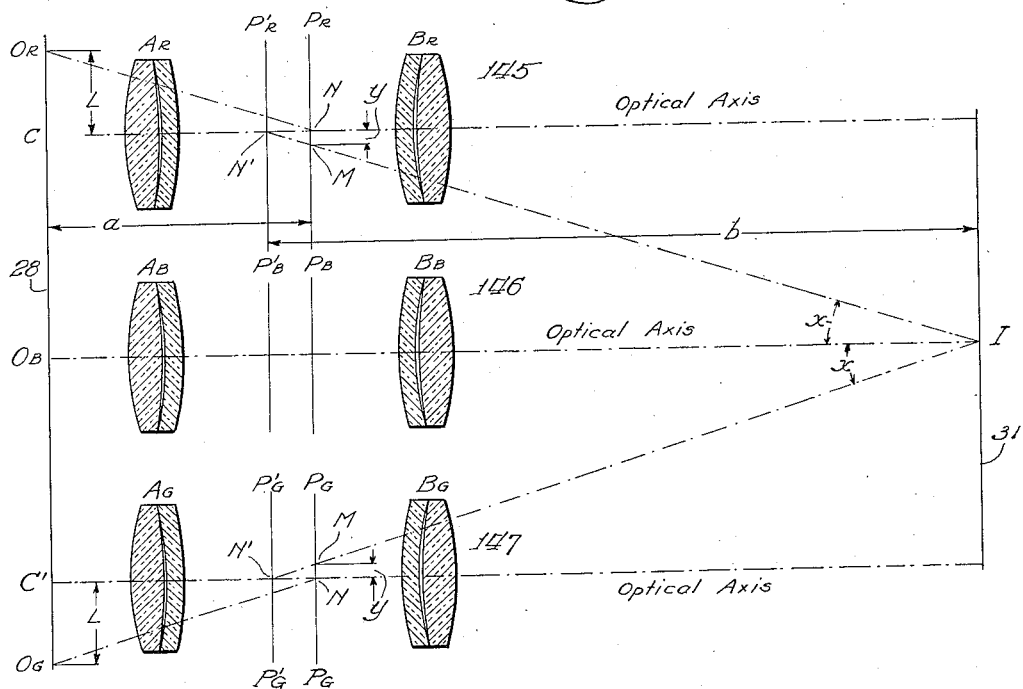
Fig. 8 is a diagram illustrative of the three superimposed lenses shown in Fig. 4 and also illustrates the centers of three objects, the images of which are to be superimposed.

Referring to Fig. 8, wherein the lenses 45, 46 and 47 are shown diagrammatically, the line 31 indicates a screen and the line 28 indicates a film providing the color cut-outs or frames. The side images projected by the lenses 45 and 47 are to be brought into accurate registration with or superimposition upon, the image projected by the middle lens 46. Points $O_R$, $O_B$ and $O_G$ represent the centers of object fields, the images of which are to be superimposed, by moving the image of $O_R$ and the image of $O_G$ in directions perpendicular to the optical axes of the lenses which remain parallel, until the images of $O_R$ and $O_G$ coincide with the image of $O_B$ at the same time that the three images are in focus upon the screen 31 at I. $A_R$ and $B_R$ are the two component parts of the projection lens system 45, the principal planes of which are $P_R$ and $P'_R$. Similarly, $A_B$ and $B_B$ are the two component parts of the projection lens system 46 of the same optical characteristics as the lens system 45, of which the principal planes are $P_B$ and $P'_B$. Also $A_G$ and $B_G$ are the two component parts of a projection lens system 47 having the same characteristics as the lens system 45 and 46 and of which the principal planes are $P_G$ and $P'_G$. In the case illustrated, it happens that for each system, $P'$ is to the left of $P$, but the following description is valid also for the case where $P'$ is to the right of $P$ and also for the case when $P$ and $P'$ coincide.

For a lens system such as 45 or 47 in air, the intersections $N$ and $N'$ made by planes $P$ and $P'$, respectively, with the optical axis are known as the nodal points of the system, and have the property that a ray proceeding from any object point such as $O_R$ or $O_G$ in such a direction that if continued in a straight line will pass through $N$, will on emergence from the system proceed in such a direction that, if continued backward in a straight line, it will appear to originate at $N'$; also the lines $O_R N$ and $N'I$ which represent conjugate rays will be parallel. Likewise, the lines $O_G N$ and the adjacent line $N'I$ represent parallel conjugate rays for the lens system 47.

If $O_R$, $O_B$, and $O_G$ are the center points of the three similar objects, their images will be superimposed at I. For each lens system the relation between object distance $a$, image distance $b$, and principal focal length $f$, all measured parallel to the optical axis, is given by the equation $$\frac{1}{a}+\frac{1}{b}=\frac{1}{f} \qquad Eq. 1$$

If the optical axis of the lens system 145 passed through the point $O_R$, then the ray $O_R N$ would coincide with that axis, and superimposition would be effected only at an infinite image distance. The displacement $L$, that is, the distance from $O_R$ to $C$ in the lens system 45 and the distance from $O_G$ to $C'$ in the lens system 47 represents the correct amount by which the systems 45 and 47 are to be moved towards the system 46 in order to bring the three images into superimposition at an image position I. Assuming that the lens systems 45 and 47 are similar and are to be moved transversely at a variable rate relative to a constant rate of longitudinal movement of all the lenses as a unit, this may theoretically be accomplished by a longitudinally movable elevating cam block or guide designated as 80 in Figs. 2 and 3. However, if the lenses 45 and 47 have the same focal lengths and are otherwise similar, such block must provide cam faces equally and oppositely inclined to the direction of longitudinal movement and such cam faces must be similarly curved and not plane as shown. The problem first to be solved is to find the theoretically correct inclination of such curved cam faces of the guide or block 80 which will cause the lens systems 45 and 47 to be moved exactly toward or away from the lens system 46 as superimposition is desired for smaller or greater image distances. Since by Eq. (1) as $b$ is increased, $a$ must be decreased, it follows, referring to Fig. 9, that for every change $\Delta a$, there must be a corresponding change $\Delta L$, such that superimposition will be maintained.

The calculations proceed on the theory that the conjugate rays $O_R N$ and $N'I$ may be treated as one straight line without appreciable error, i. e. that the separation $N'N$ along the axis, which prevents $O_R N$ and $N'I$ from being one and the same straight line is such that it may be neglected for all ordinary projection systems. In other words, the vertical distances $y$ corresponding to the spacings $NM$ between two conjugate rays $O_R N$ and $N'I$ and between the two conjugate rays $O_G N$ and $N'I$ are so small for all practicable image distances that they may be neglected, and the two rays in each case be considered as single straight lines. From Fig. 8 which may be taken as indicating any projection system it is apparent that $$\frac{y}{NN'}=\frac{O_R O_B - y}{a+b-NN'}$$

and this when solved for $y$ gives $$y=\frac{O_R O_B \times NN'}{a+b} \qquad Eq. 2$$

In one ordinary typical four inch lens system used to effect the superimposition of color cut-outs having a spacing center to center of 0.75 inch on the film 28, $NN'$ is approximately 0.1 inch. The distances $O_R O_B$ and $O_G O_B$ between object centers in Fig. 8 are 0.75 inch, corresponding to the color cut-out spacings on the film 28.

Table I

| $a+b$ | $y$ |
|---|---|
| 48 inches | 0.00156 |
| 72 inches | 0.00104 |
| 144 inches | 0.00052 |
| 240 inches | 0.00031 |
| 600 inches | 0.00012 |
| 1200 inches | 0.00006 |

In Table I are shown several values of $y$ in inches calculated from Eq. 2 for widely different distances $a+b$ and for the value of 0.1 inch for $NN'$. From the table, it is evident that $y$ is a negligible quantity for the lens systems and for the color cut-out spacings selected for illustration and since the values of $NN'$ for lens systems commonly used in projection are small compared to other dimensions, no appreciable error is introduced in the calculations for any projection system by treating $y$ as negligible.

Table II

| b | a | L | a² | dL/da | Angle |
|---|---|---|---|---|---|
| 60 | 4.2857 | .05000 | 18.3672 | .16333 | 9°16' |
| 72 | 4.2353 | .04167 | 17.9378 | .16724 | 9°30' |
| 84 | 4.2000 | .03571 | 17.6400 | .17007 | 9°39' |
| 96 | 4.1739 | .03125 | 17.4214 | .17220 | 9°46' |
| 108 | 4.1538 | .02778 | 17.2540 | .17387 | 9°52' |
| 120 | 4.1379 | .02500 | 17.1222 | .17521 | 9°56' |
| 132 | 4.1250 | .02273 | 17.0156 | .17631 | 10° 0' |
| 144 | 4.1143 | .02083 | 16.9275 | .17722 | 10° 3' |
| 156 | 4.1053 | .01923 | 16.8535 | .17800 | 10° 6' |
| 168 | 4.0977 | .01786 | 16.7911 | .17866 | 10° 8' |
| 180 | 4.0909 | .01667 | 16.7355 | .17926 | 10°10' |
| 192 | 4.0851 | .01562 | 16.6880 | .17977 | 10°11' |
| 204 | 4.0800 | .01471 | 16.6464 | .18022 | 10°13' |
| 216 | 4.0755 | .01389 | 16.6097 | .18062 | 10°14' |
| 228 | 4.0714 | .01316 | 16.5763 | .18098 | 10°15' |
| 240 | 4.0678 | .01250 | 16.5470 | .18130 | 10°16' |
| 252 | 4.0645 | .01190 | 16.5202 | .18159 | 10°17' |
| 264 | 4.0615 | .01136 | 16.4958 | .18186 | 10°18' |
| 276 | 4.0588 | .01087 | 16.4739 | .18211 | 10°19' |
| 288 | 4.0563 | .01042 | 16.4536 | .18233 | 10°20' |
| 300 | 4.0540 | .01000 | 16.4349 | .18254 | 10°21' |
| 450 | 4.0359 | .00667 | 16.2885 | .18418 | 10°26' |
| 600 | 4.0268 | .00500 | 16.2151 | .18501 | 10°29' |
| 900 | 4.0179 | .00333 | 16.1435 | .18583 | 10°32' |
| 1200 | 4.0100 | .00250 | 16.0800 | .18657 | 10°34' |
| ∞ | 4.0000 | 0 | 16.0000 | .18750 | 10°37' |

Proceeding to the determination of the theoretical curvature of the cam faces of the guide block 80 whereby the lenses 45 and 47 would be moved transversely to effect exact registry of the images at I, this curvature is defined by the varying angles of inclination of the tangents to said curved cam faces as determined by a plurality of image distances selected throughout the range of practicable projection. The requisite tangential angles of inclination to effect exact registry for the selected image distances $b$, given in column 1 of Tables II and III, have been obtained by neglecting $y$ and $NN'$ and setting up the following from Fig. 19 by inspection, it follows that $$L = \frac{Sa}{a+b} \qquad Eq.\ 3$$

where $S$ is the distance between the centers of the three color cut-outs to be superimposed by projection, which combined with Eq. 1 to eliminate $b$ gives $$L = \frac{S(a-f)}{a} \qquad Eq.\ 4$$

The rate of change $\Delta L$ with change $\Delta a$ will give the theoretically correct angle of inclination of the cam surfaces of the block or guide 80 at any point. This quantity may be found by differential calculus by the evaluation of the derivative $dL/da$, which by differentiation of Eq. 4 is found to be $$\frac{dL}{da} = \frac{Sf}{a^2} \qquad Eq.\ 5$$

In the first column of Table II are given selected image distances $b$ from 5 feet to infinity, all distances being in inches, the lenses being asumed as having a focal length of 4 inches, and S being given a value of 0.75 inch. Since the screen distance $b$ is more easily measured than the film distance $a$ these values are given in terms of screen distances $b$. The values of $a$ in the second column of Table II are obtained from Eq.1; the values of L in third column are obtained from Eq. 4; the values in the fifth column are obtained from Eq. 5; and the angles in the sixth column are those having tangents corresponding to the values in the fifth column.

An inspection of the successive values of the angles tabulated in the sixth column of Table II indicates that such angles increase with the image distances $b$ and that the successive differences of the angles become proportionately smaller for the larger image distances. If the guide 80 is provided with cam faces constructed according to the values shown in column 6 of Table II, such faces have a substantial curvature for image distances less than 180 inches, for image distances from 180 to 300 inches the curvature is appreciable but slight, and for image distances greater than 300 inches the curvature is so slight as to be imperceptible. Interpreting this theoretical and varying curvature and comparing it with known constructions and the present practice of providing cams used for this purpose with uncompensative plane surfaces, it is obvious why rather satisfactory registry of images is obtained by the use of plane cam surfaces for projection on screens at 25 feet and greater distances, and reasonably satisfactory registration of images is obtained by the use of plane cam surfaces for projection distances between 15 and 25 feet. However, projection for shorter screen distances than 15 feet is desirable for many purposes in practice and as the tabulated angles indicate, such projection is unsatisfactory for lack of accurate registry of the images if the ratio of focusing movement to transverse movement of the lenses is a constant as in the case if plane cam surfaces are used without additional compensating means. That there is inaccurate registration over the shorter ranges of projection if plane cam faces are used is not only indicated by the tabulated values but this is also confirmed in practice where it is found that plane cam faces satisfactorily used in the larger ranges of projection do not result in satisfactory projections for the shorter distances, registration being especially defective for distances from 5 to 10 feet and being entirely unsatisfactory, if not impossible, for screen distances of 5 feet and less.

The foregoing conclusions as to inadequacies of projection due to inexact registration of the images are drawn from the theoretical data shown in Table II, all of which is based on calculations assuming that a four-inch lens and a color cut-out spacing of 0.75 inch are used. Since the soundness of the conclusions, based on a single lens and a single color cut-out spacing may be questioned, additional calculations, using the foregoing equations, have been made for lenses of different focal lengths and for different color cut-out spacings and the resulting theoretical tangential angles of inclination are given in Table III.

Table III
[All distances are in inches]

| b | S=0.75 | | | S=0.33067 | |
|---|---|---|---|---|---|
| | f=2" | f=4" | f=8" | f=2" | f=4" |
| 60 | 19°19' | 9°16' | 4° 2' | 8°47' | 4° 7' |
| 84 | 19°40' | 9°39' | 4°23' | 8°57' | 4°17' |
| 108 | 19°52' | 9°52' | 4°36' | 9° 3' | 4°23' |
| 132 | 19°59' | 10° 0' | 4°44' | 9° 7' | 4°27' |
| 156 | 20° 5' | 10° 6' | 4°49' | 9°10' | 4°29' |
| 180 | 20° 8' | 10°10' | 4°54' | 9°11' | 4°31' |
| 204 | 20°11' | 10°13' | 4°57' | 9°13' | 4°33' |
| 228 | 20°14' | 10°15' | 4°59' | 9°14' | 4°34' |
| 252 | 20°16' | 10°17' | 5° 1' | 9°15' | 4°35' |
| 276 | 20°17' | 10°19' | 5° 3' | 9°15' | 4°36' |
| 300 | 20°18' | 10°21' | 5° 5' | 9°16' | 4°36' |
| 450 | 20°23' | 10°26' | 5°10' | 9°18' | 4°39' |
| 600 | 20°26' | 10°29' | 5°13' | 9°20' | 4°40' |
| 900 | 20°28' | 10°32' | 5°16' | 9°21' | 4°41' |
| 1200 | 20°33' | 10°34' | 5°17' | 9°21' | 4°43' |

In the first column of Table III, selected image distances $b$ are tabulated from 5 feet up to 100 feet, all distances being given in inches. The theoretical tangential angles of inclination required to effect exact registry, for the selected image distances $b$ given in column 1 of Table III, are obtained from Equations 1 to 5 inclusive, in the same manner as the angles in the sixth column of Table II. The angles given in the second, third and fourth columns of Table III are those required for two-inch, four-inch, and eight-inch lenses, respectively, using a value S, center to center of color cut-outs, of 0.75 inch. The angles tabulated in the fifth and sixth columns are likewise calculated for two inch and four-inch lenses, respectively, using a value of S, center to center of color cut-outs of 0.33067. The angles in each column of Table III correspond to the requisite angle of inclination of tangent lines contacting theoretically curved cam surfaces of the guide member 80. An inspection of the angles given in each column of Table III shows that all of such angles increase with the image distances and that the successive differences of such angles grow smaller as the image distances increase. It is apparent that the theoretical cam surfaces for different lengths of lenses and for different color cut-out spacings are similar in that each is hyperbolic as shown by Eq. 4, and the tabulated angles, but that they are all different in degrees of curvature. The values tabulated cover a sufficient number of lens lengths and color cut-out spacings to justify the conclusion that if uncompensated longitudinal movement of a guide member such as 80 is to be utilized to produce the variable ratio between the rate of longitudinal movement of lenses as a unit and the transverse movement of the outer lenses requisite for exact registry of the images for all focusing distances, such a guide member must provide cam faces curved in accordance with tangential angles of inclination calculated as above from general formula Eq. 4 and that such curves are hyperbolic as the form of the equation indicates.

In Fig. 2 and Fig. 3, cam members 85 and 86 are mounted on the lens carrying members 42 and 44, respectively, in operative engagement with the guide 80. If the cam faces of the guide 80 are hyperbolically curved concavely and the cam members 85 and 86 are provided with corresponding hyperbolically curved convex faces having extended contact with the cam faces of the guide, longitudinal movement of the guide is mechanically impossible and the device will not operate.

If the guide 80 and the cam members 85 and 86 are provided with cooperating plane cam surfaces as shown, any longitudinal movement of the guide actuates the lens carrying members 42 and 44 and the lenses 45 and 47 transversely at a rate having a constant ratio to the rate of longitudinal movement of the guide. A guide 80 and cam members 85 and 86 having plane contacting cam surfaces, inclined at a selected angle A, may be used if some compensating means is provided to increase or decrease the longitudinal movement of the lenses as a unit at rates such that requisite variations in the ratio of longitudinal and transverse movements of the lenses for exact registry of the images result. Referring to Figs. 2 and 3 of the drawings the compensating means is shown as taking the form of a rotatable cam member 60, constructed as hereinafter described and operatively related both to the guide 80 and to the lens carrying members 42, 43 and 44 in such a manner that as the distance of the members from the film plane is changed, the cam member provides such changes in the longitudinal or focusing motion that Eq. 4 always holds.

Table IV
[All data in inches]

| Screen distance $b$ | $a'$ | $a$ | Correction $a-a'$ |
|---|---|---|---|
| 60 | 4.2685 | 4.2857 | 0.0172 |
| 72 | 4.2238 | 4.2353 | 0.0115 |
| 84 | 4.1918 | 4.2000 | 0.0082 |
| 96 | 4.1678 | 4.1729 | 0.0061 |
| 108 | 4.1492 | 4.1538 | 0.0046 |
| 120 | 4.1342 | 4.1379 | 0.0037 |
| 132 | 4.1221 | 4.1250 | 0.0029 |
| 144 | 4.1119 | 4.1143 | 0.0024 |
| 156 | 4.1033 | 4.1053 | 0.0020 |
| 168 | 4.0959 | 4.0977 | 0.0018 |
| 180 | 4.0895 | 4.0909 | 0.0014 |
| 192 | 4.0839 | 4.0851 | 0.0012 |
| 204 | 4.0790 | 4.0800 | 0.0010 |
| 216 | 4.0746 | 4.0755 | 0.0009 |
| 228 | 4.0707 | 4.0714 | 0.0007 |
| 240 | 4.0671 | 4.0678 | 0.0007 |
| 252 | 4.0639 | 4.0645 | 0.0006 |
| 264 | 4.0610 | 4.0615 | 0.0005 |
| 276 | 4.0584 | 4.0588 | 0.0004 |
| 288 | 4.0559 | 4.0563 | 0.0004 |
| 300 | 4.0537 | 4.0540 | 0.0003 |
| 450 | 4.0358 | 4.0459 | 0.0001 |
| 600 | 4.0268 | 4.0268 | 0.0000 |
| | | | 0.0686 |

The necessary changes or corrections in longitudinal movement of the lenses as a unit for focusing, relative to the transverse movement of the outer lenses for exact registration, as effected by the cam 60, are tabulated in the fourth column of Table IV for different screen distances in inches, it being assumed that the lenses have a focal length of four inches and the color cut-outs have a spacing S of 0.75 inch. Table IV is therefore special and limited to the designated four inch lenses and color cut-outs. It is also limited by reason of the further assumptions that the guide 80 has plane cam surfaces and that the lenses 45 and 47 are moved transversely at a rate having a constant ratio to the rate of longitudinal movement of the guide and that the angle of inclination A of said guide surfaces is 10° 29′, this angle corresponding to a screen distance of 600 inches, as shown by Table II. This value of the angle A and this screen distance are chosen because it is obvious by inspection of Table II that for greater screen distances, the change of curvature of the theoretically correct cam surfaces provided by a guide such as 80 would be negligible; that is, in Eq. 4 $a$ is practically the same as $f$ for image distances of 600 inches and greater so that the equation becomes practically linear.

The equation of a straight line analogous to Eq. 4 for this angle is $$L = \frac{a'-f}{\text{Constant}} \qquad \text{Eq. 6}$$

in which the constant, for the figures given is $a_{50}-4$ divided by $L_{50}$ in which the subscripts refer to a screen distance of 50 feet. Since $a_{50}=4.0268$ and $L_{50}=0.00500$, the constant for this case is 5.36. Hence, values of $a'$ may be calculated from Eq. 6 in the form $a'=5.36L+4$. These values appear in the second column of Table IV and in the third column thereof are values of $a$ copied from Table II, and in the fourth column of the table are the required differences $a-a'$, corresponding to the changes necessary to effect the required variation in the ratio of the longitudinal movement of the lenses to the transverse movement. These differences determine the successive effective radii of a curved slot 88 provided by the cam 60 which operates as hereinafter described to vary the ratio of longitudinal movement to transverse movement of the lenses to obtain correct superimposition and focusing for all screen distances. The values a—a' given in the fourth column of Table IV, are correct for apparatus in which the lenses have a focal length of 4 inches used with color cut-outs having a center to center spacing of 0.75 inch, it being understood however, that for lenses having other focal lengths and used with films having other color cut-out spacings, a different value of the angle A should be chosen and that for other focal lengths and for other color cut-out spacings, a different set of correction values a—a' should be used. It is also apparent that a different cam 60 must be constructed for each set of correction values a—a' since the cam must have successive radii differences corresponding to the particular correction values a—a'.

The cam 60 shown in the drawings is constructed in accordance with the data in the fourth column of Table IV and is operable, by rotation of the screw 53, to actuate the bar 55 to vary the rate of longitudinal movement of the four-inch lenses 45, 46 and 47 relative to the rate of transverse movement of the outer lenses 45 and 47. The bar 55 being rigidly fastened to the middle lens carrying member 43 as above described, not only provides a support for said member and the connecting plates 48, but it is thereby also operable to reciprocally move the members 42, 43 and 44 longitudinally as a unit. The bar 55 has one end projecting forwardly to provide a mounting for a bearing member 57 and its other end projecting rearwardly a substantial amount to provide a mounting for a bearing member 58 with which the bar is rigidly connected by screw bolts 59. The member 58 provides bores in which the rods 38 and 39 closely and slidably fit whereby the rods support and permit longitudinal movement of the member and the bar 55 relative to the lens housing 30.

The lead screw 53, rotatable in either direction to simultaneously move the lenses longitudinally and transversely, is provided in two sections for convenience of assembly and dismantling. The forward section 53a provides a socket 62 for reception of the contiguous end of the rear section 53b, said sections being fastened together by a pin 63. A member 64, rigidly fastened to the lower portion of the housing 30 by screw bolts 77, provides a gear housing 76 through which the forward end of the lead screw section 53b extends. The rear end of the section 53b is journalled in the bearing member 58 and the front end of the lead screw section 53a is journalled in the bearing member 57.

The lead screw 53 is rotatable in either direction by correspondingly rotating an actuating or key member 54 which projects from the top of the housing 30 and terminates in a knurled knob 69, as best shown in Figs. 3 and 4. The shank of the actuating or key member 54 is provided with an annular groove 70. The member 54 is held in position by a pin 71 having a threaded connection with the housing 30, whereby the pin is adapted for retraction to permit removal of the key member when desired. The inner end of the key member 54 provides a bore 72 and oppositely positioned recesses 73. When the key member 54 is in operative position as shown, the upper end of a worm shaft 74 is positioned in the bore 72. A pin 75, diametrically mounted on the shaft 74, has its opposite ends positioned in the recesses 73 whereby rotation of the member 54 in either direction similarly rotates the shaft. The screw section 53b and the lower end of the shaft 74 are both journalled in the gear housing 76 provided by the member 64. A spiral gear 78, mounted on the shaft 74, meshes with a spiral gear 79 mounted on the lead screw section 53b. Rotation of the shaft 74 in clockwise and counter-clockwise directions, respectively, by means of the key member 54 as observed in Fig. 2 likewise rotates the lead screw sections 53a and 53b together, as observed in Fig. 6, without longitudinal movement thereof since the housing 76 in which the shaft and screw are journalled is fixedly connected with and is immovable relative to the housing 30.

The screw sections 53a and 53b are similarly threaded but the threads on the section 53a are shown and described as having a pitch twice the pitch of the threads on the section 53b. The elevating block or guide member 80 has a threaded connection with the section 53a, as hereinafter more particularly described and is movable longitudinally in either direction by corresponding rotation of the screw sections. The lens carrying members 42, 43 and 44 are likewise movable longitudinally and in the same direction as the guide 80 by rotation of the screw sections 53a and 53b, but at approximately one-half the rate of movement of the guide as hereinafter more fully described. This rotation of the screw sections operates to move the guide 80 alongside the lens carrying members 42, 43 and 44, the movement of the guide relative said members being for the purpose of moving the members 42 and 44 transversely relative to the middle member 43.

The inner face of the guide block 80 provides a recess 81 rectangular in cross section in which the bar 55 is positioned and closely fits to permit relative movement of the block and the bar. A sleeve 82, positioned in and closely fitting a cylindrical bore provided by the block 80, is threadedly engaged by and operable by rotation of the screw section 53a to move the block longitudinally relative to the screw. The outer faces of the block 80 each provides a recess 83 and an adjacent flanged edge 84, equally spaced from and oppositely inclined at an angle A to the axis of rotation of the screw 53.

The blocks 85 and 86 are similar, other than that one is a right and the other is a left, and each provides an inclined recess 88 in which the adjacent flanged edges 84 of the block 80 closely and slidably fit. The blocks 85 and 86 may be shifted to correct for maladjustment or to compensate for wear and for this purpose, each provides a slot 101 elongated longitudinally of the members 42 and 44. Screw bolts 87 extend through and closely fit the slots 101 and normally rigidly clamp the blocks 85 and 86 to the lens carrying members 42 and 44, respectively.

Obviously, any longitudinal movement of the block 80 to the right as observed in Fig. 3 relative the lens carrying members 42, 43 and 44 will result in a camming action moving the members 42 and 44 transversely away from the member 43 in equal amounts and movement of the block in the opposite direction will likewise move the members 42 and 44 transversely toward the member 43 in equal amounts. Since the cooperating surfaces of the blocks 80, and the members 85 and 86 are planes equally inclined at angles A, said transverse movement of the members 42 and 44 always bears a constant ratio to the amount of rotation of the screw 53 and thereby differs from the longitudinal movement of the lens carrying members as a unit which, due to the action of the cam member 60 as hereinafter more particularly described, has a variable ratio relative to the rate of rotation of said screw.

Means is provided for shifting the position of the block 80 on the lead screw section 53a independently of rotation of said screw section when found necessary or desirable to adjust or change the spacing of the outer lenses 45 and 47 from the middle lens 46 to secure accurate registry or superimposition of the images due to shrinkage or other distortion of the film. Said adjustable registering means includes a gear 102 mounted on one end of the sleeve 82, as best shown in Fig. 10. The gear 102 is actuated by a worm shaft 103 to rotate the sleeve 82. The shaft 103 is journalled in a mounting block 104, the block being rigidly fastened to the block or guide member 80 by screw bolts 105. The shaft 103 is held against longitudinal movement by a pin 106 projecting from the block 104 into an annular recess 107 provided by the shaft. The outer end of the shaft 103 projects from the block 104 and provides an end socket 108 adapted to receive the offset end of an actuating key member 109 having a knurled knob 110 on its outer end. The key member 109 is fastened to the worm shaft 103 by a pin 111 and projects through an aperture 112 in the casing 30, the aperture being substantially larger than the key member. Since the sleeve 82 is threaded on the screw 53, rotation of the sleeve by the key member 109 will correspondingly move the guide or block 80 longitudinally to adjustably increase or decrease the spacing of the lens carrying members 42 and 44 from the middle lens carrying member 43 to adapt the spacing of the lenses to the actual color cut-out or frame spacing on the film. The relatively large aperture 112 permits movement of the key member 109 with the block 80, both when the block is actuated by rotation of the lead screw section 53a for focusing and when the block is actuated by operation of the key itself for adjusting the position of the block on the screw.

The lead screw section 53b is operatively connected with the member 58 by a cam drive nut 61 and by the cam member 60. The nut 61 is threadedly engaged by the lead screw section 53b and the cam member 60 is pivotally mounted on a pin 89 projecting from a bracket 90. The bracket 90 forms a portion of the member 64 and since this member is fixedly mounted on the casing 30, the only possible movement of the cam member 60 relative to the casing is that of rotation about the pin 89. A pin 91, integrally formed with the drive nut 61 and projecting through a slot 92 in the cam member 60 not only holds the nut against rotation with the lead screw section 53b and thereby causes the nut to be moved longitudinally of the screw section as it is rotated, but said pin also causes the cam member to rotate as the nut is moved on the screw. Obviously, rotation of the screw section 53b in clockwise and in counterclockwise direction as above described will move the nut 61 on said screw section to the right and to the left respectively, as observed in Figs. 2 and 3 at one half the rate of movement of the guide member 80 on the screw section 53a.

The cam member 60 is operatively connected with the movable bearing member 59 by means of a pin 93, projecting from the bearing member and through the curved slot 98 in the cam member. The stationary pivot pin 89 and the pin 93 on the bearing member 58 are parallel and preferably but not necessarily have their longitudinal center lines coinciding with a plane parallel to the axis of rotation of the screw 53.

The respective positions and the spacings of the movable pin 91 and 93 relative to the fixed pivot pin 89, the inclination of the slot 92, and the continuously changing radii of curvature and inclination of the slot 98 relative to the pin 89 are such that for any given amount of rotation of the lead screw 53 in the manner described, there will be a corresponding variable longitudinal movement of the member 58 and the lens carrying members 42, 43 and 44 in the casing 30. Obviously, the variable rate of longitudinal movement of the member 58 and of the members 42, 43 and 44 for any given rate of rotation of the lead screw 53 depends upon the position of the nut 61 on the screw section 53b and the corresponding rotative position of the cam member 60. The cam member 60 functions as a link connecting the nut 61 with the member 58 in such a manner that the latter and the lens carrying members 42, 43 and 44 actuated longitudinally thereby as a unit are always moved longitudinally less than the corresponding movement of the nut resulting from rotation of the screw 53. For example, in the full line position of the cam member 60 and the nut 61 in Fig. 3, the cam member has been rotated clockwise as far as possible since the pin 93 is in the extreme upper end of the slot 98. This position of the cam member 60 corresponds to the maximum retracted position of the member 58 and of the three lens carrying members 42, 43 and 44. Said retracted position of the members corresponds to the maximum focusing position or image distance wherein the variation in the ratio of the rate of longitudinal or focusing movement of the lenses as a unit to the rate of transverse or registering movement of the outer lenses is a minimum. In terms of Table IV, this full line position of the cam member 60 and the nut 61 corresponds to a screen distance of 600 inches. As the screw 53 is rotated to move the nut to the left and thereby to rotate the cam member 60 in counter-clockwise direction as observed in Fig. 3, the cam member tends to increasingly retard the longitudinal movement of the member 58 and the lens carrying members 42, 43 and 44 in the amounts tabulated in fractions of an inch reading upwardly in the fourth column of Table IV. In rotating the screw 53 to move the nut 61 to the left from the position shown for focusing at shorter image distances, the guide 80 is moved to the left twice as much as the nut and the outer lens carrying members are moved inwardly accordingly in an amount sufficient to maintain exact registration of the images in the common image plane. The retardation of longitudinal movement of the lenses in moving the lenses from the full line position of the cam member 60 and nut 61 shown and corresponding to an image distance of 450 inches is 0.0001 inch. This retardation increases as the nut 61 and the guide 80 are moved to the left until it amounts to 0.0172 inch in moving the lenses from a position corresponding to an image distance of 72 inches to a position corresponding to an image distance of 60 inches. Obviously, these retardations are cumulative and the total of such in moving the lenses from the extreme right-hand position corresponding to the position of proper focusing for an image distance of 600 inches to a position corresponding to proper focusing at an image distance of 60 inches is the sum of the corrections a—a' tabulated in the fourth column of Table IV and amounts to a total of 0.0686 inch.

In moving the nut 61 and the guide 80 to the right from the position of the lenses corresponding to the image distance of 60 inches or any image distance intermediate 60 inches and a maximum of 1200 inches, the rate of longitudinal movement of the lens carrying members is obviously increased relative to the rate of transverse movement in the corresponding amount that the lens carrying members were retarded in movement from the larger to the smaller image distances so that there is absolutely accurate registry of the images for all screen distances notwithstanding the cooperating cam faces of the guide 80 and cam members 85 and 86 are plane surfaces inclined at a selected angle A to the optical axes of the lenses.

The position of the slot 98 relative to the pivot pin 89 and its curvature to accomplish the requisite retardation and acceleration of longitudinal movement of the lenses are matters of design. It is apparent that the curvature of the slot 98 is minimum at its upper end as shown, and that the curvature becomes progressively sharper toward the lower end of the slot and not only do the radii of curvature become progressively shorter, but the centers of such radii are different for different portions of the slot. It is also apparent that as the cam member 60 is rotated counter-clockwise from the position shown, its rate of rotation will be retarded relative to the movement of the nut 61 since the lever arm of the actuating pin 91 is progressively shortened by such rotation.

The successively changing radii of curvature of the slot 98 and the successively different positions of the centers of curvature essential to the accomplishment of the requisite retardation and acceleration of longitudinal movement of the lens carrying members being matters of design, a detailed description thereof is omitted as not being necessary to a proper understanding of the invention. However, as above stated, a different cam 60 is essential for each projection of lenses of different focal lengths from color cut-outs of different spacings. Cam members 60 each designed for a different lens and color cut-out spacing may be easily mounted on the pivot pin 89 and likewise different guides 80 and cam members 85 and 86 having different cooperating plane surfaces inclined at the requisite angle A may be used and thereby adapt the projector for use with a great variety of lenses and color cut-outs by merely substituting different guide and different cam members.

Although preferably the three lenses 45, 46 and 47 respectively carried by the lens carrying members 42, 43 and 44 will be identical and the angle of inclination A of the cooperating cam faces of the guide 80 and cam members 85 and 86 will be equal as described, it is obviously possible to use a lens 45 different from a lens 47 and have exact registry of the images by having the angles of inclination A of the upper and lower edges of the guide 80 correspondingly different so that each image is maintained in exact registry with the images projected by the middle lens 46 for all focusing positions.

Thus, it will be seen that the invention provides a novel lens mount and actuating means therefor in three color photography whereby the lenses are moved transversely relative to each other as the lenses are moved longitudinally as a unit, the longitudinal movement being at a variable ratio relative to the transverse movement such that exact registry of the images is maintained for all focusing positions of the lenses throughout the entire range of practicable projection, including image distances as short as 60 inches.

Having thus described our invention, it is obvious that various immaterial modifications may be made in the same without departing from the spirit of our invention; hence, we do not wish to be understood as limiting ourselves to the exact form, construction, arrangement and combination of parts herein shown and described or uses mentioned.

What we claim as new and desire to secure by Letters Patent is:

1. Apparatus of the kind described comprising supporting means for a color cut-out, a plurality of juxtaposed lenses having a common image plane and movable as a unit longitudinally towards and away from a film carried by said supporting means for focusing at different screen distances, said lenses being movable transversely relative to each other with their optical axes in parallel relation simultaneously with said longitudinal movement, a shaft rotatable in either direction, means operable by rotation of the shaft to move said lenses transversely relatively to each other at rates having a constant ratio relative to the rate of rotation of the shaft, and mechanism operable by rotation of the shaft to move said lenses longitudinally as a unit at rates having a constantly varying ratio relative to the rate of rotation of the shaft, said varying ratio being such as to maintain exact registry of the images respectively projected by the lenses for all positions thereof.

2. Apparatus of the kind described comprising a supporting means for a color cut-out film, three juxtaposed lenses having a common image plane and movable as a unit longitudinally toward and away from a film carried by said supporting means for focusing at different screen distances, the outer of said lenses being movable transversely relative to the middle lens with their optical axes in parallel relation simultaneously with said longitudinal movement, a shaft rotatable in either direction, means operable by rotation of the shaft to move said outer lenses transversely relative to the middle lens at rates having a constant ratio relative to the rate of rotation of the shaft, and mechanism operable by rotation of the shaft to move said lenses longitudinally as a unit at rates having a constantly varying ratio relative to the rate of rotation of the shaft, said varying ratio being such as to maintain exact registry of the images respectively projected by the lenses for all positions thereof.

3. Apparatus of the kind described comprising supporting means for a color cut-out film, three juxtaposed lenses having a common image plane and movable as a unit longitudinally toward and away from a film carried by said supporting means for focusing at different screen distances, the outer of said lenses being movable transversely relative to the middle lens with their optical axes in parallel relation simultaneously with said longitudinal movement, a shaft rotatable in either direction, means operable by rotation of the shaft in opposite directions to reciprocally move said outer lenses transversely relative to the middle lens at rates having a constant ratio relative to the rate of rotation of the shaft, and mechanism operable by rotation of the shaft to move said lenses longitudinally as a unit away from the film as the spacing of the lenses transversely is diminished and to move said lenses toward the film as the spacing of the lenses transversely is increased, said mechanism operating to constantly vary the ratio of the rate of longitudinal movement of the lenses to the rate of said transverse movement, said ratio increasing as the lenses are moved toward the film and diminishing as the lenses are moved away from the film.

4. Apparatus of the kind described comprising supporting means for a color cut-out film, three laterally juxtaposed lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being greater than the pitch of the threads on the other end, a guide member for actuating said outer lenses transversely and mechanism for moving said lenses longitudinally as a unit having threaded connections with the larger and smaller pitched threads of the shaft respectively whereby rotation of the shaft moves said guide member in the same direction as said mechanism but at a greater rate, and means operable to progressively increase the ratio of the rate of focusing said movement of the lenses as they are moved toward the film and to progressively diminish said ratio as the lenses are moved away from the film, said changing ratio being such that exact registry of the images is maintained for all movements of the lenses within the range of practicable projection.

5. Apparatus of the kind described comprising supporting means for a color cut-out film, three laterally juxtaposed lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being greater than the pitch of the threads on the other end, a guide member for actuating said outer lenses transversely and mechanism for moving said lenses longitudinally as a unit having threaded connections with the larger and smaller pitched threads of the shaft respectively whereby rotation of the shaft moves said guide member in the same direction as said mechanism but at a greater rate, said guide member being movable alongside the middle lens as the lenses are moved longitudinally, a cam member connecting each of the outer lenses with said guide member, whereby movement of the guide member toward and away from the film moves said outer lenses towards and away from the middle lens at a rate having a fixed ratio relative to the rate of rotation of the shaft, said actuating mechanism being operable to progressively increase the ratio of the rate of longitudinal movement to the rate of transverse movement of the outer lenses as the lenses are moved toward the film and to progressively decrease said ratio as the lenses are moved away from the film, said variable ratio being such that there is exact registry of the three images respectively projected by the lenses for all positions of the lenses within the practicable range of projection from the largest to the smallest.

6. Apparatus of the kind described comprising supporting means for a color cut-out film, three laterally juxtaposed lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being greater than the pitch of the threads on the other end, a guide member for actuating said outer lenses transversely and mechanism for moving the lenses longitudinally as a unit having threaded connections with the larger and smaller pitched threads of the shaft, respectively, whereby rotation of the shaft moves said guide member in the same direction as said mechanism but at a greater rate, said guide member being movable alongside the middle lens as the lenses are moved longitudinally, a cam member connecting each of the outer lenses with said guide member whereby movement of the guide member toward and away from the film moves said outer lenses toward and away from said middle lens at a rate having a fixed ratio relative to the rate of rotation of the shaft, said actuating mechanism comprising a nut threadedly connected with and movable longitudinally of the shaft by rotation thereof, means operable to move the lenses longitudinally as a unit and an oscillatable cam operatively connecting said nut with said last mentioned means, said cam being adapted to progressively increase the ratio of the rate of focusing movement to the rate of registering movement of the outer lenses as the lenses are moved toward the film and to progressively diminish said ratio as the lenses are moved away from the film, said variable ratio being such that there is exact registry of the three images respectively projected by the lenses for all positions of the lenses within the practicable range of projection from the largest to the smallest.

7. Apparatus of the kind described comprising supporting means for a color cut-out film, three laterally juxtaposed four-inch lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being twice the pitch of the threads on the other end, a guide member for actuating said outer lenses transversely and mechanism for moving said lenses longitudinally as a unit having threaded connections with the larger and smaller pitched threads of the shaft respectively, whereby rotation of the shaft moves said guide member in the same direction as said mechanism but at twice the rate, said guide member being movable alongside the middle lens as the lenses are moved longitudinally, a cam member connecting each of the outer lenses with said guide member, the cooperating faces of said guide and cam members being equally and oppositely inclined to the optical axes of said lenses at an angle of 10° 29″ whereby movement of the guide member toward and away from the film moves said outer lenses toward and away from the middle lens at a rate having a fixed ratio relative to the rate of rotation of the shaft, said actuating mechanism being operable to progressively increase the ratio of the rate of longitudinal movement to the rate of transverse movement of the outer lenses as the lenses are moved toward the film and to progressively decrease said ratio as the lenses are moved away from the film, said variable ratio being such that there is exact registry of the three images respectively projected by the lenses for all positions of the lenses within the practicable range of projection from the largest to the smallest.

8. Apparatus of the kind described comprising supporting means for a color cut-out film, three laterally juxtaposed eight-inch lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being twice the pitch of the threads on the other end, a guide member for actuating said outer lenses transversely and mechanism for moving said lenses longitudinally as a unit having threaded connections with the larger and smaller pitched threads of the shaft respectively, whereby rotation of the shaft moves said guide member in the same direction as said mechanism but at twice the rate, said guide member being movable alongside the middle lens as the lenses are moved longitudinally, a cam member connecting each of the outer lenses with said guide member, the cooperating faces of said guide and cam members being equally and oppositely inclined to the optical axes of said lenses at an angle of 5° 13″ whereby movement of the guide member toward and away from the film moves said outer lenses toward and away from the middle lens at a rate having a fixed ratio relative to the rate of rotation of the shaft, said actuating mechanism being operable to progressively increase the ratio of the rate of longitudinal movement to the rate of transverse movement of the outer lenses as the lenses are moved toward the film and to progressively decrease said ratio as the lenses are moved away from the film, said variable ratio being such that there is exact registry of the three images respectively projected by the lenses for all positions of the lenses within the practicable range of projection from the largest to the smallest.

9. Apparatus of the kind described comprising supporting means for a color cut-out film, three laterally juxtaposed four-inch lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being twice the pitch of the threads on the other end, a guide member for actuating said outer lenses transversely and mechanism for moving said lenses longitudinally as a unit having threaded connections with the larger and smaller pitched threads of the shaft respectively, whereby rotation of the shaft moves said guide member in the same direction as said mechanism but at twice the rate, said guide member being movable alongside the middle lens as the lenses are moved longitudinally, a cam member connecting each of the outer lenses with said guide member, the cooperating faces of said guide and cam members being equally and oppositely inclined to the optical axes of said lenses at an angle of 4°40″ whereby movement of the guide member toward and away from the film moves said outer lenses toward and away from the middle lens at a rate having a fixed ratio relative to the rate of rotation of the shaft, said actuating mechanism being operable to progressively increase the ratio of the rate of longitudinal movement to the rate of transverse movement of the outer lenses as the lenses are moved toward the film and to progressively decrease said ratio as the lenses are moved away from the film, said variable ratio being such that there is exact registry of the three images respectively projected by the lenses for all positions of the lenses within the practicable range of projection from the largest to the smallest.

10. Apparatus of the kind described comprising supporting means for a color cut-out film, three laterally juxtaposed four-inch lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being twice the pitch of the threads on the other end, a guide member for actuating said outer lenses transversely and mechanism for moving said lenses longitudinally as a unit having threaded connections with the larger and smaller pitched threads of the shaft respectively whereby rotation of the shaft moves said guide member in the same direction as said mechanism but at twice the rate, said guide member being movable alongside the middle lens as the lenses are moved longitudinally, a cam member connecting each of the outer lenses with said guide member, the cooperating faces of said guide and cam members being equally and oppositely inclined to the optical axes of said lenses at an angle of 10°29″ whereby movement of the guide member toward and away from the film moves said outer lenses toward and away from the middle lens at a rate having a fixed ratio relative to the rate of rotation of the shaft, said actuating mechanism comprising a nut threadedly connected with and movable longitudinally of the shaft by rotation thereof, means operable to move the lenses longitudinally as a unit and an oscillatable cam operatively connecting said nut with said last mentioned means, said cam being adapted to progressively increase the ratio of the rate of focusing movement to the rate of registering movement of the outer lenses as the lenses are moved toward the film and to progressively diminish said ratio as the lenses are moved away from the film, said variable ratio being such that there is exact registry of the three images respectively projected by the lenses for all positions of the lenses within the practicable range of projection from the largest to the smallest.

11. Apparatus of the kind described comprising supporting means for a color cut-out film, three laterally juxtaposed eight-inch lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being twice the pitch of the threads on the other end, a guide member for actuating said outer lenses transversely and mechanism for moving said lenses longitudinally as a unit having threaded connections with the larger and smaller pitched threads of the shaft respectively whereby rotation of the shaft moves said guide member in the same direction as said mechanism but at twice the rate, said guide member being movable alongside the middle lens as the lenses are moved longitudinally, a cam member connecting each of the outer lenses with said guide member, the cooperating faces of said guide and cam members being equally and oppositely inclined to the optical axes of said lenses at an angle of 5° 13″ whereby movement of the guide member toward and away from the film moves said outer lenses toward and away from the middle lens at a rate having a fixed ratio relative to the rate of rotation of the shaft, said actuating mechanism comprising a nut threadedly connected with and movable longitudinally of the shaft by rotation thereof, means operable to move the lenses longitudinally as a unit and an oscillatable cam operatively connecting said nut with said last mentioned means, said cam being adapted to progressively increase the ratio of the rate of focusing movement to the rate of registering movement of the outer lenses as the lenses are moved toward the film and to progressively diminish said ratio as the lenses are moved away from the film, said variable ratio being such that there is exact registry of the three images respectively projected by the lenses for all positions of the lenses within the practicable range of projection from the largest to the smallest.

12. Apparatus of the kind described comprising supporting means for a color cut-out film, three laterally juxtaposed four-inch lenses having a common image plane and movable longitudinally as a unit toward and away from a film carried by said supporting means for focusing, the outer lenses being movable transversely relative to the middle lens with their optical axes in parallel relation for registering of the images simultaneously with said focusing movement of the lenses, a threaded shaft rotatable in either direction, the pitch of the threads on one end of the shaft being twice the pitch of the threads on the other end, a guide member for actuating said outer lenses transversely and mechanism for moving said lenses longitudinally as a unit having threaded connections with the larger and smaller pitched threads of the shaft respectively whereby rotation of the shaft moves said guide member in the same direction as said mechanism but at twice the rate, said guide member being movable alongside the middle lens as the lenses are moved longitudinally, a cam member connecting each of the outer lenses with said guide member, the cooperating faces of said guide and cam members being equally and oppositely inclined to the optical axes of said lenses at an angle of 4° 40″ whereby movement of the guide member toward and away from the film moves said outer lenses toward and away from the middle lens at a rate having a fixed ratio relative to the rate of rotation of the shaft, said actuating mechanism comprising a nut threadedly connected with and movable longitudinally of the shaft by rotation thereof, means operable to move the lenses longitudinally as a unit and an oscillatable cam operatively connecting said nut with said last mentioned means, said cam being adapted to progressively increase the ratio of the rate of focusing movement to the rate of registering movement of the outer lenses as the lenses are moved toward the film and to progressively diminish said ratio as the lenses are moved away from the film, said variable ratio being such that there is exact registry of the three images respectively projected by the lenses for all positions of the lenses within the practicable range of projection from the largest to the smallest.

GEORGE S. MONK.
FRANK P. CASE.